United States Patent [19]

Kahn et al.

[11] 4,059,340

[45] Nov. 22, 1977

[54] DOPED LIQUID CRYSTAL DISPLAY DEVICE

[75] Inventors: Frederic Jay Kahn, Palo Alto, Calif.; Gary Newton Taylor, Fanwood, N.J.

[73] Assignee: Bell Telephone Laboratories, Incorporated, Murray Hill, N. J. 07974

[21] Appl. No.: 524,702

[22] Filed: Nov. 18, 1974

[51] Int. Cl.² .................................................. G02F 1/13
[52] U.S. Cl. ............................. 350/160 LC; 252/299
[58] Field of Search .................. 350/160 LC; 252/299

[56] References Cited

U.S. PATENT DOCUMENTS

| 3,666,947 | 5/1972 | Haas | 350/160 LC X |
| 3,809,456 | 4/1972 | Goldmacher et al. | 350/160 LC |

FOREIGN PATENT DOCUMENTS 18,397  10/1972  Japan .......................... 360/160 LC

OTHER PUBLICATIONS

Melchior et al., Applied Physics Letters, vol. 21, No. 8, 15 Oct. 72, pp. 392–394.

*Primary Examiner*—Edward S. Bauer
*Attorney, Agent, or Firm*—George S. Indig; Peter V. D. Wilde

[57] ABSTRACT

The use of dopants enhances optical contrast and range of writing speeds in liquid crystal display devices. Such dopants are characterized by greater solubility in the isotropic phase than in the liquid-crystalline phase of a liquid crystal material.

1 Claim, 1 Drawing Figure

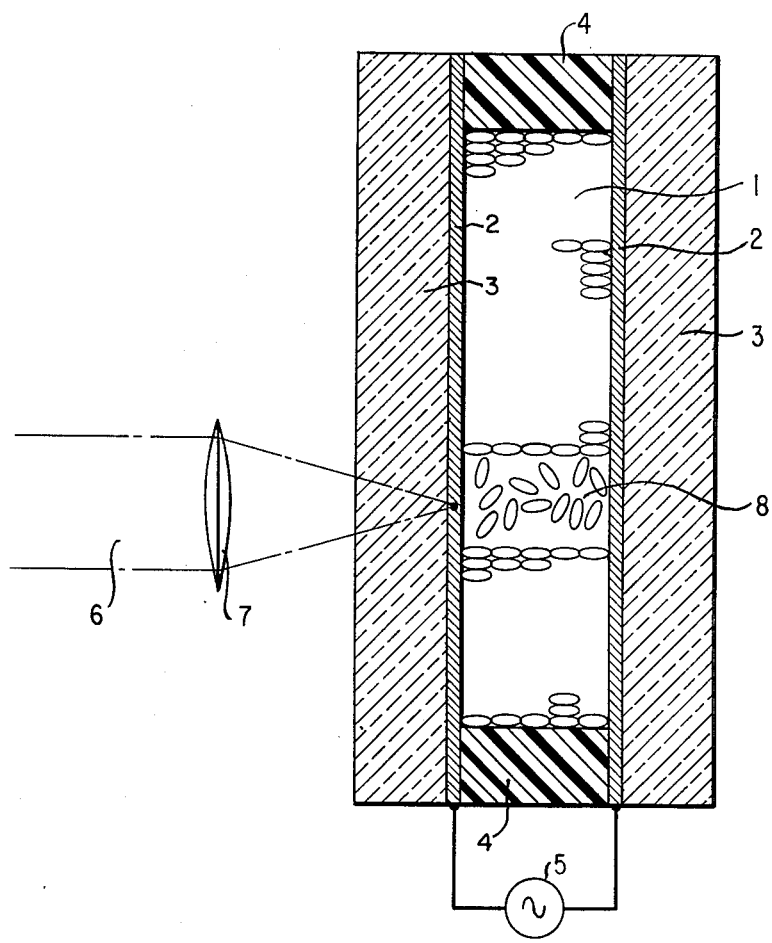

DOPED LIQUID CRYSTAL DISPLAY DEVICE

BACKGROUND OF THE INVENTION

1. Field of the Invention

The invention is concerned with optical devices which use liquid crystal materials for recording, storage, and display of graphical patterns.

2. Description of the Prior Art

Recent advances in laser technology and liquid crystal recording materials have made possible the development of high resolution graphical display devices which have distinct advantages over devices utilizing a cathode ray tube. Among such advantages are high resolution and image brightness, absence of flicker, and the capability of large screen display; devices enjoying these advantages are surveyed, for example, in "Infrared Laser Addressing of Media for Recording and Displaying of High-Resolution Graphic Information," *Proceedings of the IEEE 61* (1973), pp. 1007–1013. To store graphical information such devices use a thin layer of a liquid crystal material contained between a pair of flat electrodes which are transparent to visible light but which absorb infrared radiation. A suitable electrode material is $In_{2-x}Sn_xO_{3-y}$ which can be conveniently deposited by sputtering on fused silica substrates. In the following, an assembly consisting of a liquid crystal material contained between a pair of visibly transparent, infrared absorbing electrodes is called a liquid crystal cell.

Projection of patterns recorded in a liquid crystal cell can be effected in a manner analogous to the projection of a photographic slide in a projector utilizing a projector lamp and condenser and projection lenses. However, recording of patterns in a liquid crystal cell is effected thermally rather than optically and requires no chemical processing. Typically, while the bulk of the liquid crystal material is held at a temperature at which it is in a transparent, ordered liquid crystal phase, an isotropic phase is created by localized heating of the liquid crystal material. If the heated areas are allowed to cool at an appropriate rate, these areas do not order upon cooling to the temperature of the bulk liquid crystal phase and act as light scattering centers. Conversely, if the bulk of the material is in a light scattering state, local heating followed by cooling in the presence of an electrical field applied across the liquid crystal layer can be used to record patterns by locally eliminating light scattering centers.

Thermal writing is conveniently effected by a focused $x$-$y$ deflected, intensity modulated infrared laser beam which locally heats the infrared absorbing electrodes. By moving the laser beam across the liquid crystal cell, any desired graphical pattern can be recorded.

Two types of liquid crystals have been used successfully in such display devices. Both types, "cholesteric" as well as "smectic" liquid crystals, have elongated, cigar-shaped molecules; they differ, however, in the arrangement of the molecules in thin liquid crystalline films. Specifically, for a uniformly ordered thin film of a Smectic liquid crystal material, molecules in the transparent state are arranged into parallel layers with the major axis of each molecule oriented, on the average, perpendicular to the layer. On the other hand, molecules in the transparent, uniformly ordered state of a cholesteric liquid crystal material have a helical ordering, the molecules on the average lying in planes normal to the helical ordering axis. In either case, uniform alignment in the liquid crystal phase is induced by a coating of a coupling agent applied to the substrate surfaces between which the liquid crystal material is contained. In F. J. Kahn, "Orientation of Liquid Crystals by Surface Coupling Agents," *Appl. Phys. Lett.* 22 (1972), pp. 386–388, a silane coupling agent is recommended for this purpose.

A specific example of a cholesteric liquid crystal is the material used for experiments described in H. Melchior et al., "Thermally Addressed Electrically Erased High-Resolution Liquid Crystal Light Valves," *Appl. Phys. Lett.* 21 (1972), pp. 392–394 and consisting of 90 percent N-(p-methoxybenzylidene)-p-n-butylaniline (MBBA) and 10 percent cholesteryl nonanoate (CN). An example of a smectic liquid crystal is N-(p-cyanobenzylidene)-p-n-octylaniline (CBOA) used in F. J. Kahn, "Laser-Addressed Thermo-Optic Smectic Liquid-Crystal Storage Displays," *Appl. Phys. Lett.* 22, (1973) pp. 111–113. Liquid crystal cells using a smectic rather than a cholesteric liquid crystal material are more versatile due to a local erase capability. While erasure of scattering centers in a cholesteric liquid crystal merely requires the application of a suitable voltage to the electrodes containing the liquid crystal material, erasure of a pattern recorded in a smectic liquid crystal requires reheating the recorded pattern into the isotropic phase followed by cooling to the initial temperature of the smectic liquid crystal phase in the presence of a suitable voltage applied across the liquid crystal layer.

SUMMARY OF THE INVENTION

Dopants which are more soluble in the isotropic phase than in the liquid crystal phase of a liquid crystal material enhance the contrast ratio of patterns recorded in liquid crystal cells and increase the range of writing speeds at which high-contrast patterns can be recorded. These effects are believed to be due to nucleation of light scattering centers induced by the presence of the dopants.

BRIEF DESCRIPTION OF THE DRAWING

The drawing is a cross-sectional view of a preferred embodiment of a liquid crystal display device using doped smectic liquid crystal materials.

DETAILED DESCRIPTION

1. The FIGURE

The FIGURE shows doped liquid crystal layer 1 contained between electrodes 2 which are supported by fused silica plates 3 and separated by spacers 4. Generator 5 supplies a voltage for erasing patterns in the liquid crystal material. Infrared laser beam 6 focused by lens 7 locally heats infrared absorbing electrodes 2 and creates an isotropic region 8 which becomes light scattering center 8 upon cooling to the temperature of the liquid crystal phase.

2. The Mechanism

Certain substances, when added to liquid crystal substances, improve the contrast ratio in light valve display devices. These substances are characterized by being more soluble in the isotropic phase than in the liquid crystal phase.

For example, in the display system described in F. J. Kahn et al., "Performance and Characteristics of Smectic Liquid Crystal Storage Displays," in *Liquid Crystal Displays*, T. Kallard, ed., Ortosonic Press, 1973, contrast was improved by 60 percent when a cholesteric liquid crystal cell containing 90 percent MBBA and 10 percent CN was doped with 1 percent N-(p-methoxybenzylidine)-o-n-butylaniline (o - MBBA). More dramatically still, contrast was improved by 600 percent when a smectic liquid crystal light valve containing a ternary eutectic mixture of 56.7 percent CBOA, 28.3 percent N-(p-cyanobenzylidene)-p-n-decylaniline (CBDA) and 15.0 percent N-(p-cyanobenzylidene)-p-n-pentadecylaniline (CBPDA) was doped with 2 percent N-(p-cyanobenzylidene)-o-n-decylaniline (o-CBDA). Table 1 below shows contrast ratios achieved by doping this ternary eutectic mixture with a number of suitable dopants.

Table 1

Contrast Ratio in the doped ternary eutectic mixture of 56.7 percent CBOA, 28.3 percent CBDA, and 15.0 percent CBPDA by weight.

| Dopant | % Dopant | Contrast Ratio |
| --- | --- | --- |
| — | 0 | 2–3 |
| n - Decylbenzene | 1.0 | 10 |
| o - Nitrononylbenzene | 1.0 | 12 |
| o - MBBA | 1.0 | 12 |
| Adamantane | 1.0 | 14 |
| p - Butylaniline | 1.0 | 15 |
| o - CBDA | 0.25 | 5 |
| o - CBDA | 2.0 | 18 |

This first effect, namely the improvement of the contrast ratio, is tentatively ascribed to enhanced nucleation during the creation of light scattering centers. A second effect of such dopants, best observed in smectic liquid crystals, is the broadening of the range of possible writing speeds. This feature may be of advantage in applications such as the mixed recording of graphical and alphanumeric information for which writing speeds can vary greatly.

A third beneficial effect of the presence of nonliquid crystalline dopants lies in a reduced fading tendency of recorded patterns and is most evident in cholesteric liquid crystals. It is believed that this effect is due to a decreased tendency for light scattering centers to coalesce into larger, less scattering domains due, in turn, to a reduction in potential energy in the core region of light scattering centers.

While the use of contrast enhancing dopants is described above primarily in connection with liquid crystal devices utilizing thermal writing and optical projection means, their use may also be beneficial in storage-type liquid crystals used in electrical writing modes and intended for direct viewing or projection viewing.

For the sake of uniform distribution of the dopant throughout the liquid crystal material, the dopant material is beneficially added prior to assembly of the liquid crystal cell and with the liquid crystal material heated to a temperature at which it is in the isotropic state. Furthermore, mechanical or acoustical stirring is beneficially utilized to prevent local variations in dopant concentration. For an appreciable contrast-enhancing effect dopants should be added in amounts of at least 0.1 percent by weight. Amounts greater than 5 percent should be avoided, however, in order to prevent an undue broadening of the transition range of temperatures between the liquid crystal phase and the isotropic phase.

What is claimed is:

1. Liquid crystal information storage and display device comprising a layer comprising a liquid crystal material which in the display mode is partly in an essentially transparent state and partly in a light scattering state, means for maintaining the temperature of said layer below the temperature of transition from the liquid crystal phase to the isotropic phase, a pair of optically transparent electrodes containing said layer and of which at least one is infrared absorbing, an infrared laser incident on said infrared absorbing electrode from a direction external to said layer for locally heating said infrared absorbing electrode, thereby locally raising the temperature of said layer above said transition temperature, so as to locally change the orientation of the molecules of said liquid crystal material, CHARACTERIZED IN THAT said layer contains nonliquidcrystalline dopants which are more soluble in the isotropic phase than in the liquid crystal phase in the concentration range of from 0.1 percent to 5 percent by weight whereby the optical contrast ratio between said essentially transparent state and said light scattering state is improved, and further CHARACTERIZED IN THAT either (1) said liquid crystal material is a mixture of MBBA and CN and said dopant is o-MBBA, or (2) said liquid crystal material consists essentially of a mixture of CBOA, CBDA, and CBPDA and said dopant is selected from the group consisting of o-CBDA, o-MBBA, p-butylaniline, o-nitrononylbenzene, n-decylbenzene, and adamantane.

* * * * *